March 12, 1957  R. D. MATHEWS  2,785,071
METHOD OF IMPREGNATING FRUIT WITH A SUGAR SOLUTION
Filed Dec. 21, 1953
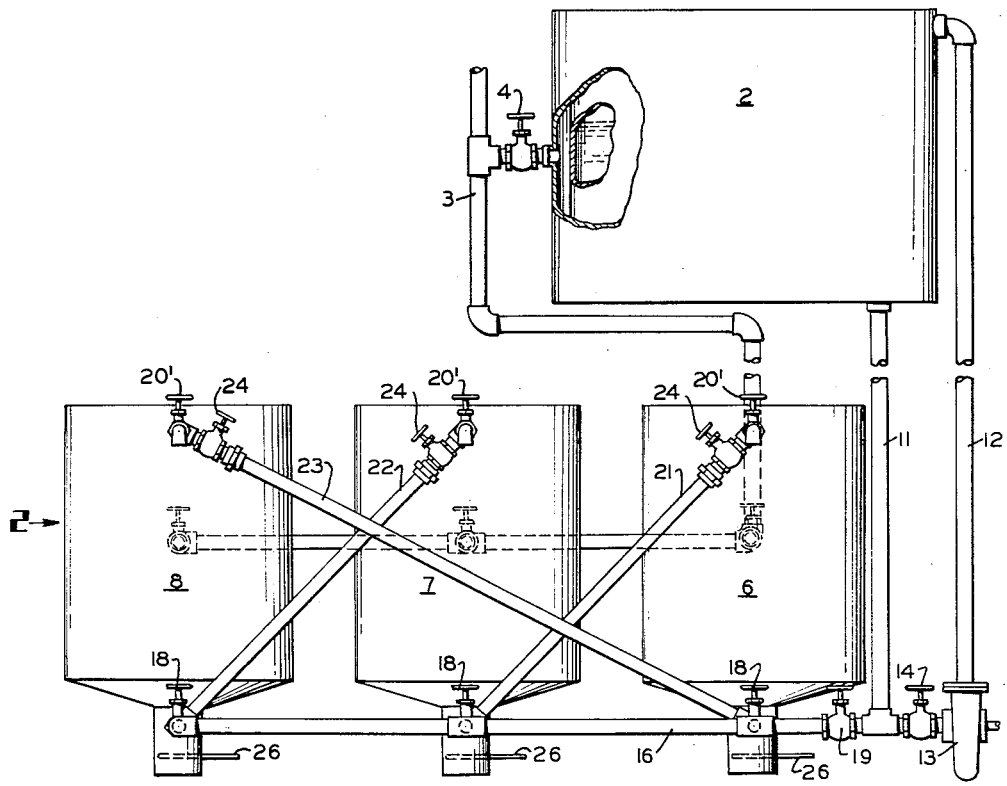
FIG_1
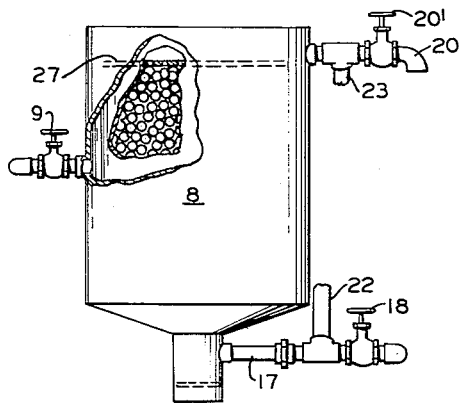
FIG_2
INVENTOR.
RICHARD D. MATHEWS
BY Charles M Fryer
ATTORNEY United States Patent Office 2,785,071
Patented Mar. 12, 1957

2,785,071

METHOD OF IMPREGNATING FRUIT WITH A SUGAR SOLUTION

Richard D. Mathews, Redwood City, Calif., assignor to S & W Fine Foods, Inc., San Francisco, Calif., a corporation of California Application December 21, 1953, Serial No. 399,361

3 Claims. (Cl. 99—102)

This invention relates to the impregnation of liquid-permeable, cellular, liquid containing materials with a solution of solute in a solvent, the solution being miscible with the liquid in the cellular material; and more particularly to the candying of fruit or vegetables, both herein referred to as fruit, with relatively concentrated sugar solution.

In preparing candied fruit the impregnation of the fruit flesh with concentrated sugar solution, hereinafter referred to as sirup, has commonly been carried out by filling a tank with previously treated fruit flesh, adding sufficient warm highly concentrated sirup to cover the fruit, and then gently stirring the fruit and sirup mixture. Since the water and sirup tend to form a homogeneous solution, sirup diffuses inwardly into the fruit cells, and water contained in the pretreated fruit flesh diffuses outwardly through the cellular walls of the fruit.

The diffusion and resultant mixing of sirup and water results in dilution of the concentrated sirup solution. Consequently, in order to achieve impregnation of the fruit with the desired high concentration of sirup, the used dilute sirup surrounding the fruit is generally removed from the tank and reconcentrated by evaporation in a vacuum pan in order to avoid wasting the diluted sirup. The reconcentrated sirup is then replenished with more sirup of high concentration so that there will be sufficient sirup to cover the fruit, and the sirup is again placed into the tank containing the fruit. The foregoing process of impregnation of the fruit and reconcentration of the used sirup is repeated until the fruit has been impregnated with the requisite high concentration of sirup.

The preceding method heretofore employed for impregnating fruit flesh with sirup has many disadvantages. A principal disadvantage is that the fruit shrivels and shrinks with a resultant significant loss in both quantity and quality of marketable merchandise. This shriveling of the fruit is caused by the fact that water or dilute sirup in the fruit has a higher rate of diffusion outwardly through the fruit walls than the diffusion rate of the more concentrated sirup entering the fruit. As a result of the unequal rate of diffusion, a partial vacuum is created in the fruit cells, and the atmospheric pressure crushes the product. In addition, a considerable amount of labor is required in changing and reconcentrating the sirup, the vacuum pans employed in reconcentrating the sirup are expensive, and sirup is lost in the exchange from tank to vacuum pan and back again. Furthermore, reconcentrated and reused sirup gradually becomes more colored thereby requiring removal of the color or use of different tanks of sirup for each color of fruit.

Several methods have previously been devised in order to produce a product without the shriveling attendant in the process heretofore described. These methods are based upon the fact that diffusion of sirup into the fruit will occur at approximately the same rate as diffusion of liquid out of the fruit if the concentration of sirup surrounding the fruit is not greatly different from the concentration of the sirup inside the fruit cells. In one such method the fruit is first placed in a tank of dilute sirup, and then successively in tanks of gradually increasing concentrations of sirup until the desired concentration of sirup in the fruit is achieved. In another method designed to avoid shriveling of the product, the fruit is initially placed in a dilute solution of sirup and the entire mixture is continuously heated, thereby gradually increasing the concentration of the sirup due to evaporation of water. New sirup of the proper concentration is added regularly in order to maintain a volume of sirup sufficient to cover the fruit.

However, the quality of the candied fruit prepared by the foregoing methods is not all that is to be desired. Furthermore, the processes are slow and expensive to carry out, and much handling is required of the fruit and of the sirup.

Summarizing this invention, the foregoing problems in the impregnation of fruit flesh with sirup are effectively eliminated by the provision of a method and apparatus in which a bed of pretreated fruit which contains water in the fruit cells is subjected to a flow of a stream of the concentrated sirup. The tendency of the sirup to form a solution with liquid contained in the fruit cells causes partial diffusion of liquid outwardly from the fruit and partial diffusion of sirup into the fruit, which diffusion dilutes the flowing sirup and results in the establishment of a flow of sirup in which the concentration of sugar at the forefront of the flow continually approaches zero, and the concentration gradiently increases upstream of said forefront until it reaches approximately the original concentration of the sirup supply. Thus, substantially each particle of the fruit is subjected to a flow of gradually increasing concentration of sirup from substantially zero concentration until such particle contains a sirup concentration substantially equal to the concentration of the main source of sirup supply, and this prevents shriveling because the fruit is never subjected to great differentials in sirup concentration.

The method of this invention is particularly adapted to be carried out by delivering a flow of sirup to the bottom of a container of a bed of fruit, and effecting the impregnation of fruit as the sirup rises through the bed. Furthermore, a continuous system of impregnating fruit may be provided by interconnecting a series of at least two tanks with connecting pipes from the top of one tank to the bottom of the next. In this manner, as sirup reaches the top of one tank it will be conducted by gravity to the bottom of the next tank, and then will rise through the fruit in such tank. The provision of valves for the temporary elimination of one tank from the system without stopping the flow of sirup into the remaining tanks enables the removal of fruit in which the impregnation has been completed, and provides for a system that may be continuously operated. However, in principle the method of this invention may be carried out with use of only one tank.

The advantages of impregnating fruit in accordance with this invention are readily apparent in the greatly enhanced quality of the fruit and in the considerable savings effected in time, labor and material. The quality of the candied fruit is improved in that there is no shrinkage or shriveling of the fruit since the fruit is subjected to an initial flow of very dilute sirup of gradually increasing concentration until essentially the full concentration of the sirup employed is reached. In addition, the color of the product is excellent since no color degradation occurs as it does in other processes in which reconcentration of the sirup by vacuum cooking causes caramelization. The impregation of fruit in accordance with this invention involves much less labor than previous processes since the sirup is simply permitted to flow through the fruit without need for changing or handling either the sirup or the fruit until the impregnation process is completed.

Furthermore, the loss of sirup in the continuous flow system of this invention is negligible compared to systems in which sirup or fruit must be moved and the sirup reconcentrated. Also, the necessity of employing expensive vacuum pans for reconcentration of the diluted sirup is eliminated, since there is no need to reconcentrate the sirup when the process of this invention is employed.

In general, this invention is applicable to the impregnation of any liquid permeable material with a solution of a solute. However, this invention is particularly useful in the impregnation with sirup of any food commonly candied, such as lemon peel, orange peel, grapefruit peel, zucca melon, pineapple, citron, papaya and cherries, which products when candied are commonly diced and mixed together for use as a mix by the bakery and consumer trade.

Referring to the drawings, which illustrate a preferred embodiment of the apparatus of this invention:

Fig. 1 is a more or less schematic side elevational view of such apparatus.

Fig. 2 is an end elevation of one of the impregnating tanks of the apparatus looking in the direction of arrow 2 in Fig. 1, with a portion of the tank cut away to show the interior, and portions of connecting pipes cut away for purposes of clarity.

In greater detail, the pretreatment of the fruit in preparing it for impregnation with sirup is carried out in a conventional manner well known in the art. Since it is not usually feasible to impregnate the fresh fruit immediately after it is picked, the fruit is commonly stored in solutions of approximately ¼ to 1% sulfur dioxide brine as a preservative. Shortly before the fruit is to be impregnated, it is pretreated in the well known manner by boiling the fruit particles in water. This pretreatment has the effect of eliminating the sulfur dioxide by volatilization, and also performs the important functions of cooking the fruit, tenderizing it, loosening the fibrous material and making the fruit more receptive to the sirup. After the pretreatment by boiling has been completed, the fruit is washed in water several times, diced to the desired size, and again washed to provide a clean product. At this time, if it is desired to dye the fruit, the dyeing may be carried out employing any certified food dye, customarily employed for this purpose.

After the fruit has been treated in the foregoing well known manner, the fruit flesh is in condition for impregnation with sirup. In accordance with this invention, the impregnation of the fruit with sirup is best carried out by subjecting the fruit to a slow flow of sirup entering through the bottom of a tank containing a bed of the fruit in water. The water surrounding the fruit flesh serves to maintain the fruit cells filled with water, thereby preventing the fruit from becoming dehydrated and providing sufficient water in the fruit for the requisite water-sirup exchange by diffusion. However, it is not essential that there be water surrounding the fruit just before the flow of sirup reaches the fruit as long as the fruit cells at such time are substantially filled with water. Preferably, the water surrounding the fruit is brought to near boiling, about 200° F., before receiving the sirup, to aid in maintaining a product free from micro-organisms, and then the tank of fruit is allowed to cool just before and during the impregnation process. However, this heating of the surrounding water is immaterial insofar as the principle of the invention is concerned.

The flow of sirup entering through the bottom of the tank displaces the water surrounding the bed of fruit, and forces the water upwardly in advance of the sirup. As the sirup rises through the particles of fruit in the bed, the tendency of water in the fruit cells and sirup surrounding the fruit to form a homogeneous solution results in diffusion of water from the fruit cells and diffusion of sirup into the fruit. The diffusion process causes rapid dilution of the sirup approximately in accordance with the following equation:

$$M_3 = \frac{M_2 V_f + M_1 V_s}{V_f + V_s}$$

In this equation, $M_1$ is the molar concentration of sugar in the sirup surrounding the fruit, $M_2$ is the molar concentration of sugar in the liquid inside the fruit, $M_3$ is the molar concentration of $M_1$ after equalization with $M_2$, $V_s$ is the volume of sirup surrounding the fruit, and $V_f$ is the volume of liquid in the fruit.

From the foregoing equation it is apparent that in commencing the process, when the top of the upwardly flowing syrup or in other words the forefront portion of the sirup flow having the concentration of the sirup supply has slowly passed by an initial portion of the fruit containing a volume of water $V_f$ equal to the volume of the forefront portion $V_s$ of the flow, the concentration of such forefront portion of the sirup will be reduced to one-half of its original concentration. This is so because the concentration of sugar in the fruit $M_2$ equals zero before the forefront of the flow reaches such fruit. Similarly, the concentration of the continually oncoming forefront portion of the sirup flow becomes further reduced by one-half as such forefront passes each successive portion of fruit containing a volume of water equal to the volume of such oncoming forefront portion.

The portion of the sirup flow immediately upstream or in other words downwardly of the forefront is intermixed with the dilute sirup solution that was established in the fruit by the forefront of the flow, and thus this upstream portion of the flow is not diluted the same amount as the forefront in passing the same amount of fruit. In terms of the equation, $M_2$ no longer equals zero when an upstream portion of the sirup flow reaches the fruit, and therefore a segment of such upstream portion is diluted less than the forefront as it passes fruit containing a similar volume of liquid. In a similar manner the portions of the sirup flow still further upstream are diluted at a progressively lesser amount as such portions pass the successive portions of fruit containing dilute sirup of a concentration established by the immediately preceding downstream portion of the flow.

As a result of the foregoing exchange of water or dilute sirup in the fruit with the flowing more concentrated sirup, the top or forefront of the rising or onflowing sirup becomes rapidly diluted until it approaches zero concentration of sugar; and the sirup below or upstream of the forefront is less diluted the further upstream such sirup is from said forefront, until approximately the original concentration of the sirup supply is reached. The difference in specific gravity of the more dilute rising sirup at the forefront of the flow compared to the heavier more concentrated upstream sirup that is lower in the impregnation tank enables the flow of the gradiently increasing concentration of sirup to be maintained since the lighter sirup is always on top.

In this manner, all fruit above that part of the bed in the very bottom of the tank, is subjected to a flow of gradually increasing concentration of the sirup upwardly from zero concentration and shriveling of the fruit is obviated. This flow is always of slightly higher sugar concentration than the concentration of the sirup in the fruit which it surrounds, since the concentration of sirup in the fruit is established by the immediately preceding more dilute portion of the flowing stream.

The flow of sirup through the bed of fruit may be at any rate that is slow enough to permit the diffusion process to establish an approximately homogeneous concentration of sugar between the sirup surrounding a particle of fruit and the sirup inside said particles;

thereby providing for the establishment and maintenance of the flow of sirup of gradiently increasing concentration as previously described. The rate of flow may be as slow as is desired without effecting the process. However, for economic reasons it is desirable to complete the impregnation relatively rapidly by employing as high a rate of flow as possible, without exceeding the rate at which substantial equalization of sirup concentration in any portion of the stream will occur with the sirup concentration in the fruit past which such stream portion flows.

If the sirup flows too rapidly through the bed of fruit, the concentration of the sirup surrounding the fruit increases far more rapidly than the diffusion rate through the fruit walls permits the concentration of sirup inside the fruit to increase. Should this occur, shrinkage of the fruit would result, similar to that previously described in the processes now commonly employed in the trade. The factors governing the maximum rate of flow of the sirup stream for any given system, include the temperature of the sirup, the type of fruit and size of fruit particles through which the sirup diffuses, and the pressure at the place where the diffusion occurs. These factors are variable but can be readily determined for any given system, so as not to cause the stream to flow too fast.

One convenient method of determining the maximum rate of flow is by employing the fruit as a hydrometer. When the fruit floats high upon the forefront of the advancing sirup flow, the flow rate is obviously too fast to permit equalization by diffusion of the heavy sirup surrounding the fruit and the water inside the fruit cells. When the fruit sinks into the visibly advancing flow of sirup, the rate of flow is sufficiently slow to provide a satisfactory exchange of sirup between fruit and stream, but as previously mentioned, the rate of flow can be as slow as desired. By varying the rate of flow of the sirup while observing the behavior of the fruit so that the bed of fruit is not forced strongly upward by the sirup flow, but rests in the sirup flow with approximately the same specific gravity as the sirup surrounding the fruit, the optimum rate of flow for practical commercial operation but yet consistent with the best results may easily be determined. As typical examples, a flow rate of 6 inches per hour was the maximum rate suitable for impregnating orange peels ⅜ x ⅜ x ⅜ inch in size with a flow of sirup of 79% soluble solids at 140° F. Likewise, a 20% slower flow rate of sirup has proven to be satisfactory for impregnating pineapple of ½ x ½ x ½ inch in size with sirup under similar conditions, and a 20% faster flow rate may be employed in impregnating zucca melon of ⅜ x ⅜ x ⅜ inch in size.

The sirup employed in the candying of fruit is well known in the trade. A sirup composed of commercial glucose and invert sugar dissolved in water is commonly employed. The commercial glucose is sold under the name of corn sirup, and is prepared by hydrolyzing corn starch with hydrochloric acid or enzymes. The invert sugar is also available commercially and is composed of partially hydrolyzed sucrose. An invert sugar in which forty percent of the sugar has been converted is readily available and is commonly used in the preparation of sirup for candying fruit.

The proportions and concentration of the commercial glucose and invert sugar used in the sirup may be any generally employed for candying fruit. Where the sugar is to provide the sole preservative in rendering the product safe from micro-organisms, seventy-seven percent by weight of sirup in the fruit should consist of soluble sugar solids. However, at normal storage temperatures ordinary sucrose crystallizes at about sixty-seven percent by weight soluble solids, and the invert sugar crystallizes at about seventy-five percent soluble solids. The glucose in the sirup mixture enables the preparation of a sirup of the requisite high concentration of sugar.

A sirup of the desired concentration may be provided by a mixture of equal parts of commercial glucose containing eighty-two and one-half percent by weight soluble solids and a forty percent invert sugar solution containing seventy-four percent soluble solids, which results in a sirup mixture containing seventy-eight and one-quarter percent by weight soluble sugar solids. This sirup provides a safe margin of sugar concentration for the impregnation of fruit in accordance with this invention since the flowing sirup should be of slightly higher concentration than the concentration of sirup required in the fruit. If a preservative such as sodium benzoate is employed in the sirup for preparation of candied fruit commonly called benzoate pack, the concentration of sugar in the sirup may be lowered accordingly, as is well known in the art.

Flavoring or additives such as citric acid may be mixed with the sirup if desired. Citric acid sufficient to bring the pH of the sirup from 3.5 to 3.9 is generally employed in candying all fruit to be used in a diced fruit mix in order to improve the flavor of the candied fruit and help in control of micro-organisms. Similarly, in cases where additional flavoring of another type is required, it may be added to the sirup in accordance with well established practice.

Although the temperature of the sirup supply is not a critical factor in the impregnation of fruit in accordance with this invention, for best results, the temperature of the sirup supply in the supply tank is best maintained between 120° F. to 140° F. in order to facilitate diffusion of the sirup into the fruit cells. At temperatures above that range the gravity separation of water and the gradiently increasing concentration of sirup is not as effective as is to be desired. Also, at high temperatures the sugar in the sirup may tend to become caramelized thereby undesirably discoloring the sirup. At lower temperatures, the rate of diffusion of sirup into the fruit is undesirably slow and requires a correspondingly slow flow of sirup through the bed of fruit in order to produce a satisfactory product.

The fruit is tested for completion of the impregnation process by means of a refractometer calibrated to read in terms of percent soluble solids in the sirup. A particle of fruit is removed from the bed of fruit, a few drops of sirup are squeezed from the fruit and the percent soluble solids in this sirup is quickly determined by means of the refractometer. Also, the refractometer may be employed to follow the progress of the stream of sirup surrounding the fruit as it flows through the fruit, thereby determining the forefront of the flow, and the portion of the flow upstream where the sirup concentration reaches approximately the concentration of the sirup supply.

After the impregnation of the fruit with sirup has been completed, the impregnated fruit weighs approximately forty percent more than the untreated fruit. The impregnated fruit may be stored in drums in the sirup solution until the fruit is to be packaged or marketed. The fruit may then be screened, and drained in a squirrel cage drier. If the common mixture of candied diced fruits is to be prepared, the fruits are mixed, screened and may be drained in either a centrifuge or a squirrel cage in accordance with practice common in the art.

Reference is now made to the drawings which illustrate a preferred form of apparatus for conducting the continuous method of this invention. The apparatus comprises a steam jacketed sirup supply tank 2 supplied with steam to heat its contents by means of supply piping 3 having a suitable steam control valve 4. Piping 3 is also connected to a plurality of steam jacketed impregnating tanks 6, 7 and 8, the supply of steam being controlled by valves 9.

Supply tank 2 is connected at its bottom to outlet pipe 11 which is connected to a pipe 12 through a pump 13; pipe 12 being in turn connected to the top of tank 2.

This enables sirup solution when first fed into tank 2 to be mixed thoroughly by recirculation from the bottom to the top of the tank down through pipe 11 and up through pipe 12 by opening a control valve 14 connected between pipe 11 and the pump. It is to be understood that the recirculating means is not employed when the system is impregnating fruit, as the valve 14 is then closed and the pump operation stopped. However, the flow of sirup into the impregnation part of the system may be stopped at any time during impregnation in order to fill tank 2 with fresh ingredients for the sirup, and mix such ingredients by recirculation through pipes 11 and 12.

Impregnating tanks 6, 7 and 8 are connected to outlet pipe 11 by a manifold pipe 16 and pipes 17 leading respectively from the manifold pipe to the bottoms of tanks 6, 7 and 8; and in each of pipes 17 is provided a control valve 18. Also, a main control valve 19 located between tank 6 and pipe 11, is provided in manifold pipe 16. Thus, sirup can be conducted by gravity to the bottoms of the respective fruit impregnating tanks. The requisite slow rate of flow of sirup is more easily controlled by utilizing valves and a gravity flow than by employing pumps for such purpose.

The top of each impregnating tank is provided with an overflow pipe 20 having manually operable control valve 20' to control overflow of substantially pure water in a manner to be explained more fully hereinafter; and tanks 6, 7 and 8 are interconnected in the following manner to provide for continuous fruit impregnating operation of two or three of such tanks at a time. The top of tank 6 is connected to the bottom of tank 7 by a pipe 21 connected ahead of valve 20' of tank 6, and to pipe 17 of tank 7 ahead of its control valve 18. Similarly, the top of tank 7 is connected to the bottom of tank 8 by pipe 22, and the top of tank 8 is connected to the bottom of tank 6 by pipe 23; a control valve 24 being provided in each of pipes 21, 22 and 23. A sliding gate valve 26 is provided at the bottom of each of the fruit impregnating tanks for discharge of its contents when desired.

In starting the system in operation, the sirup ingredients are first mixed in supply tank 2 by recirculation through pipes 11 and 12 as previously related; tank 2 being heated during this recirculation and during the subsequent impregnation operation, at a preferable temperature of about 140° F. Stainless steel screens 27 are loosely mounted inside the impregnating tanks to float on top of the beds of fruit therein to thus prevent the flow of fruit through the system.

After the sirup has been mixed, valve 14 is closed; and the valves in the impregnation portion of the system are set so that sirup can flow by gravity from supply tank 2 to manifold 16 to the bottom of tank 6, from the top of tank 6 through pipe 21 to the bottom of tank 7, from the top of tank 7 through pipe 22 to the bottom of tank 8, and overflow only from the top of tank 8. Main control valve 19 is employed to regulate the flow of the sirrup at the desired rate.

The sirup rises slowly through tank 6 forcing the less dense water in advance of it. When the forefront of the sirrup reaches the outlet at the top of tank 6 it is directed to the bottom of tank 7 and proceeds to rise in tank 7, displacing water ahead of it, but no sirup has yet reached tank 8. By the time the sirup has risen to the top of tank 7, the fruit in tank 6 has been impregnated with the desired high concentration of sirup.

The valves are then set to isolate tank 6 from the system and to continue to direct such flow into the bottom of tank 7, up through the fruit in tank 7, down through pipe 22, and then to the bottom of tank 8. The substantially pure water preceding the flow of sirup is allowed to overflow from the top of tank 8.

In the meantime, as soon as tank 6 is isolated, the impregnated fruit is removed from the tank by means of its product discharge valve 26. Tank 6 is then filled with fresh fruit, and connected back in the system by closing the overflow valve 20' of tank 8, and setting the valves to connect the top of tank 8 with the bottom of tank 6, through pipe 23; tank 6 thus becoming the end tank with its overflow valve 20' open; and tank 7 being the first tank. In a similar manner, as the fruit in each tank becomes impregnated with sirup, the tank is isolated from the system and the impregnated fruit is removed while impregnation occurs in the remaining two tanks connected in series. In this connection, it is to be understood that any plurality of tanks can be operated in this manner. The number of tanks in series should, however, be sufficient to absorb all of the sugar from the sirup and maintain a constant overflow of pure water from the last tank of the system.

As a specific example of actual operation of impregnating orange peel in accordance with this invention, each of tanks 6, 7 and 8 is 2.2 ft. high and of 500 gallons capacity. They are each filled with one ton of commercial diced orange peel after the customary preservative pretreatment; sufficient water being placed in each tank to cover the fruit bed. The tanks of fruit are then brought to a near boil, at a temperature of about 200° F. for preserving reasons and for aiding diffusion, after which the heating is terminated. Then heated sirup composed of equal volumes of an eighty-two and one-half percent by weight solution of commercial glucose and seventy-four percent by weight of a forty percent converted invert sugar, which mixture is heated to a temperature of 130° F., is permitted to flow into the system as previously explained.

The rate of flow of sirup is approximately 30 gallons per hour and the sirup flows up the respective tanks at a rate of about three inches per hour. This takes about 16 hours for the forefront of the advancing sirup to pass through a tank and well up the next tank connected thereto. In about 24 hours, the concentration of the sirup flow at the top of the first tank in the system is approximately the concentration of the sirup supply, and the fruit in the first tank is substantially completely impregnated with concentrated sirup. All measurements of sugar concentration of sirup are made with a refractometer calibrated to read in percent soluble sugar solids. The resultant product proves to be without wrinkles and to have a very good color.

I claim:

1. The method of impregnating a liquid permeable fruit and vegetable product with an aqueous sugar containing solution, said product being of the type which when subjected to a static mass of such solution results in shrinkage of the product, comprising obviating such shrinkage by providing an upright bed of the product wherein the product contains liquid miscible with said solution, effecting flow of said solution in a stream and in a direction only upwardly through said bed whereby the top of said stream becomes continuously diluted and said stream has a gradiently increasing concentration of such sugar in a downward direction from said top of the stream, and regulating the upward flow of said stream at such rate as to maintain said gradiently increasing sugar concentration from the top to the bottom of said stream and to effect substantial equalization between the concentration of sugar contained in the product and the concentration of the sugar in the solution surrounding the product whereby the top of said upwardly flowing stream is maintained at a concentration of sugar approaching zero.

2. The method of claim 1 in which a series of such beds is provided and the solution is continuously conducted from the top of each bed to the bottom of a succeeding bed, and substantially the same controlled rate of upward flow of solution is maintained in each bed, the number of beds being such that substantially pure water will flow from the top of the last bed of the series.

3. The method of claim 2 wherein each bed of product is isolated from the series when the product therein is substantially completely impregnated with said sugar in the solution, and said isolated bed is replaced by a fresh bed of product to provide the last bed of such series.

References Cited in the file of this patent

UNITED STATES PATENTS

| | | |
|---|---|---|
| 1,418,273 | Benjamin | June 6, 1922 |
| 1,534,050 | Barrielle | Apr. 21, 1925 |
| 1,861,307 | Gernhardt | May 31, 1932 |
| 1,937,256 | Taylor | Nov. 28, 1933 |

FOREIGN PATENTS

| | | |
|---|---|---|
| 589,085 | Germany | Dec. 2, 1933 |